Dec. 31, 1957  G. V. KARLSON  2,818,288
SECURING PARTS TOGETHER IN INDEXED POSITION
Original Filed Oct. 28, 1943  2 Sheets-Sheet 1
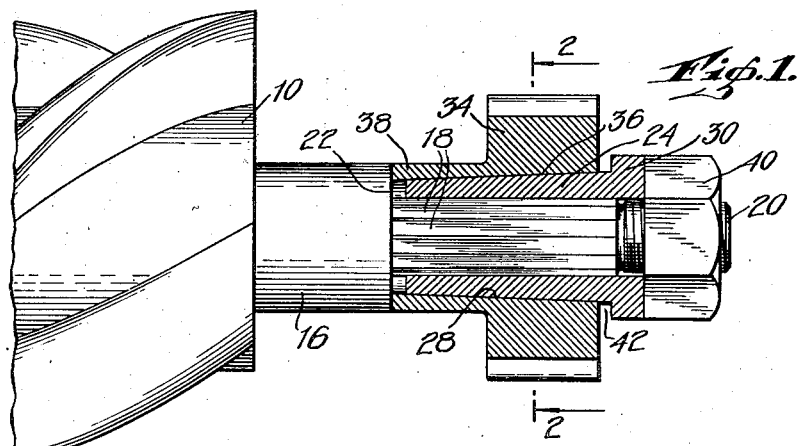
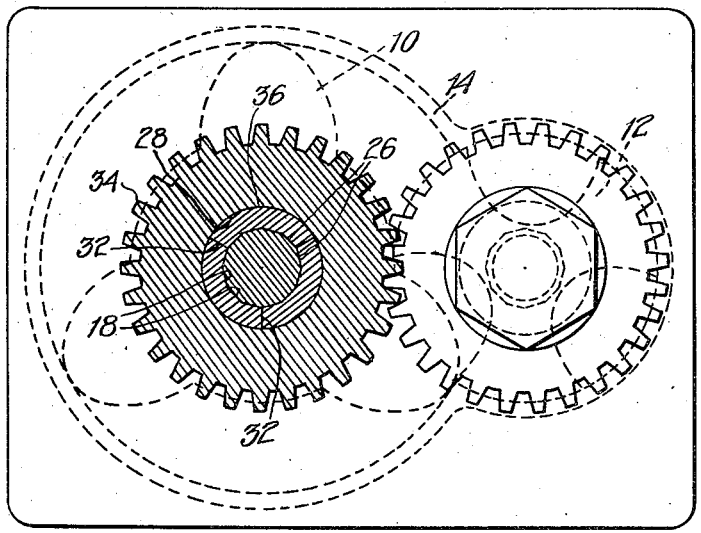
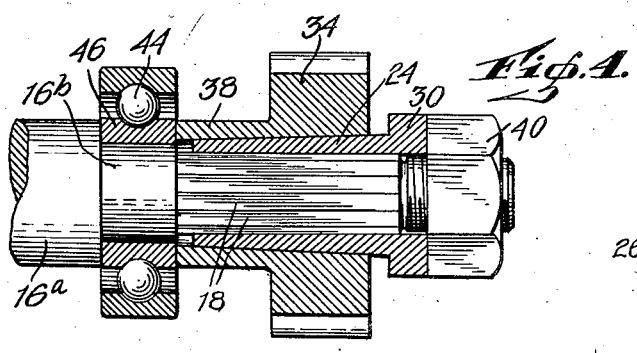
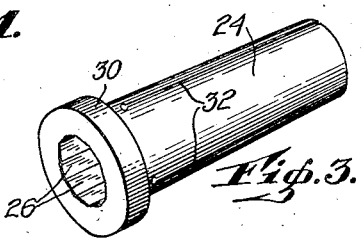
INVENTOR
Gustav V. Karlson
BY
his ATTORNEY Dec. 31, 1957  G. V. KARLSON  2,818,288
SECURING PARTS TOGETHER IN INDEXED POSITION
Original Filed Oct. 28, 1943  2 Sheets-Sheet 2
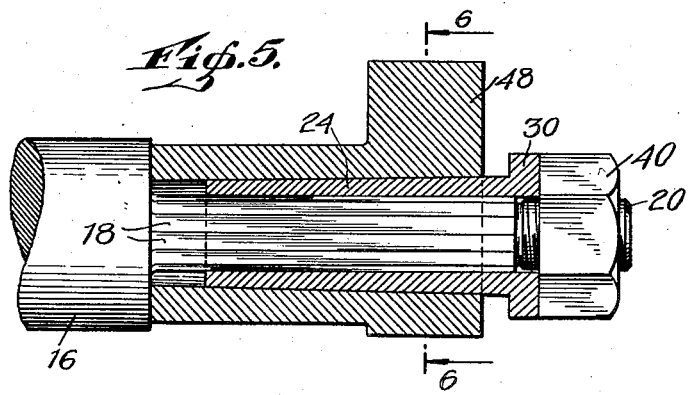
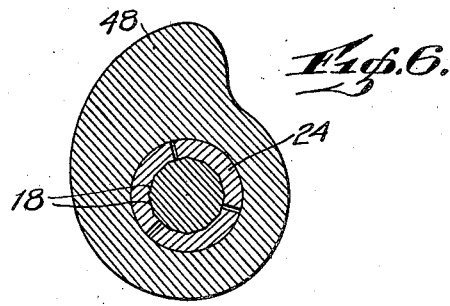
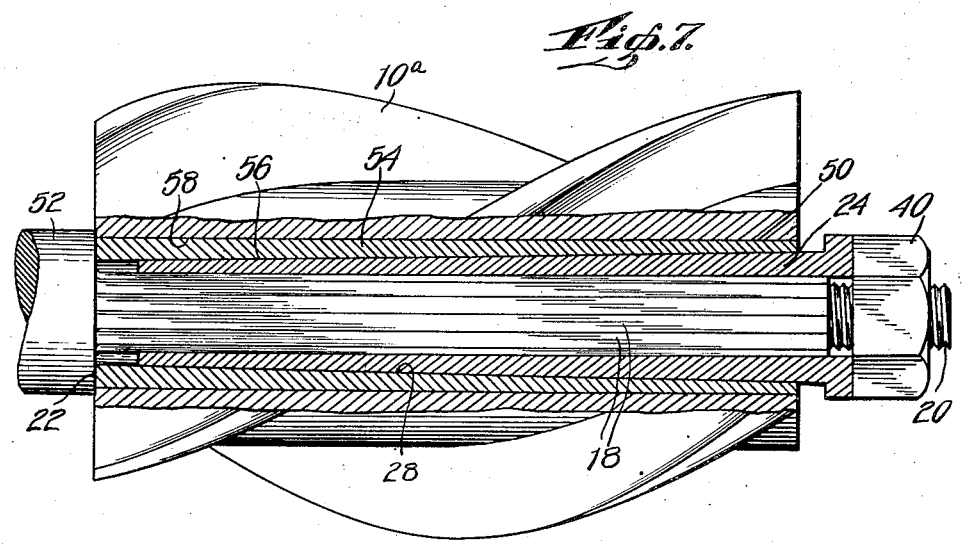
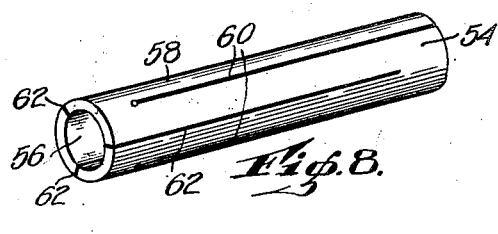
INVENTOR
Gustav V. Karlson
BY
his ATTORNEY United States Patent Office 2,818,288
Patented Dec. 31, 1957

2,818,288

SECURING PARTS TOGETHER IN INDEXED POSITION

Gustav V. Karlson, Elizabeth, N. J., assignor, by mesne assignments, to Svenska Rotor Maskiner Aktiebolag, Nacka, Sweden, a corporation of Sweden Continuation of abandoned application Serial No. 508,047, October 28, 1943. This application February 15, 1952, Serial No. 271,654

4 Claims. (Cl. 287—53)

This application is a continuation replacing my copending application Serial No. 508,047 now abandoned, filed October 28, 1943.

The present invention relates to the securing of parts in indexed position and has for its primary object the provision of new and improved means for securing parts such as timing gears, cams and work pieces or the like on shaft parts of rotors, work-holding spindles or other parts of like nature where it is essential that the parts be secured together in extremely accurately indexed relation. A further object is the provision of novel means of the above described general character which will permit the parts to be readily assembled, disassembled and reassembled and easily adjusted, when assembled, to extremely accurately indexed position and firmly secured in the indexed position. A still further object is to provide such means suitable for use with small diameter shaft parts or other shaft parts that are highly stressed in service, which will not appreciably weaken any such part of given diameter, so that the advantages of the invention may be made use of in substantially all sizes and kinds of mechanisms. Other and more detailed objects of the invention, together with advantages to be derived from its use, will be more fully pointed out as this description proceeds.

The invention is particularly applicable for the securing in indexed position of the timing gears for intermeshing rotors in rotary engines, such as motors or compressors of the kind in which intermeshing rotors operate in timed relation and out of contact with each other. In such devices, the efficiency of the device is largely dependent upon the size of the clearance between the intermeshing parts and in order to obtain desired efficiency, such clearance is made as small as is practically possible, such clearance, in certain instances, being of the order of a thousandth of an inch or even less. Moreover, such clearance is required at a substantial radius from an axis of rotation of the rotor and it is consequently obvious that if clearance of such small value is to be maintained and contacted between the intermeshing parts avoided, the timing gears for holding the intermeshing parts in spaced relation must not only themselves be very accurately formed but must also be indexed with extreme accuracy. This will be particularly evident when, as is the case in many instances, the timing gear must be secured to a shaft part of relatively small diameter so that any error in indexing of the gear on the shaft is multiplied, perhaps several times, at the radius where the intermeshing parts must be accurately timed. In devices of the kind under discussion, it has been found from experience that it is a practical impossibility to secure sufficiently reliable accuracy of indexing by the use of keys between the timing gear and the shaft and it has also been found impractical to secure sufficiently reliable accuracy of indexing by bolting the gears to a face-plate or the like, even when used in conjunction with locating dowels.

In order to overcome the deficiencies of the known methods of securing parts in indexed relation, the present invention contemplates the locking of the parts in indexed position by means of a frictional lock which will permit the parts to be adjusted to predetermined indexed position and thereafter frictionally locked in such position by means which eliminates the possibility of any torque being transmitted to the part being locked in the indexed position, due to the force applied to the parts to produce the required locking engagement. This is essentially accomplished in accordance with this invention through the use of a sleeve member interposed between the shaft part and the body to be secured in indexed position, the sleeve being axially movable but rotationally fixed relative to the shaft part and embodying an axially tapered surface operative upon axial movement of the sleeve relative to the shaft part and the body to be indexed to create and maintain radial pressure between the parts sufficient to frictionally grip and hold the part to be indexed relative to both the sleeve and the shaft part.

In order to explain the more detailed nature of the invention there is illustrated in the accompanying drawings, by way of example but without limitation, different examples of practical application of the invention which will now be described.

In the drawings:

Fig. 1 is a side view, partly in section, of part of a rotor for a rotary engine having a timing gear fixed thereto in accordance with the present invention;

Fig. 2 is an end elevation, partly in section on the line 2—2 of Fig. 1, of a rotary engine embodying timing gears and employing the principles of the invention;

Fig. 3 is a perspective view of the sleeve element shown in Figs. 1 and 2;

Fig. 4 is a fragmentary section shown another embodiment of the invention;

Fig. 5 is a view similar to Fig. 4 illustrating the use of the invention in fixing a cam on a shaft part;

Fig. 6 is a section taken on the line 6—6 of Fig. 5;

Fig. 7 is a view, partly in section, showing a body fixed on a shaft part such as a work spindle and illustrating a different form of the invention; and Fig. 8 is a perspective view of one of the sleeve members in Fig. 7.

Referring now to Figs. 1 and 2, the apparatus illustrated is a rotary engine adapted to be operated as a compressor and having intermeshing spirally grooved rotors 10 and 12 mounted for rotation in a casing 14. The compressor shown by way of example is of the kind disclosed in Patent No. 2,174,522, granted October 3, 1939, to Alf Lysholm to which patent reference may be had for the details of the functioning of the compressor not germane to the present invention, which is concerned only with the rotors and their timed relation. It will be understood, of course, that this invention is not limited in its scope to the particular compressor device here illustrated by way of example.

As shown in Fig. 1, the rotor 10 is provided with a shaft part 16 which may be integral with the main body of the rotor or permanently fixed thereto as by a pressed fit or the like. The shaft part provides a journal adjacent to the body of the rotor and beyond the journal portion the shaft is milled or otherwise machined to a non-circular cross-section, preferably, for reasons hereinafter explained, in the form of a series of axially extending and relatively narrow flats 18. The portion of the shaft beyond that providing the flats 18 is threaded as at 20. Between the portion of the shaft providing the flats 18 and the journal portion of the shaft a step or shoulder 22 is provided.

Around the shaft there is provided a sleeve 24, the bore of which is broached or otherwise formed to provide a plurality of flats 26 corresponding in size and number with the flats 18 on the shaft. These parts are very accurately fitted to insure against any relative turning movement between them when assembled, and lapping of the parts to secure a very precise fit is advantageously employed. The outer surface 28 of the sleeve is of circular cross-section and as will be seen from Fig. 1 is axially tapered, the taper shown in the drawing being somewhat exaggerated for clarified illustration. At one end the sleeve is provided with a flange or collar 30 and as will be seen more clearly in Fig. 3, the sleeve is split by a plurality of slits 32 extending from one end of the sleeve to a place adjacent to the collar at the other end. The timing gear 34 has a circular bore 36 of the same taper as that of the outer surface 28 of the sleeve and has a hub portion 38 extending axially beyond the end of the sleeve 24 to abut against the shoulder 22 on the shaft.

As will be observed from Fig. 1, the length of the sleeve 24 is such that it is clear of the abutment provided by shoulder 22 when the parts are in assembled position.

The nut 40, which advantageously although not necessarily may be of the self-locking variety, is screwed on the threaded portion 20 of the shaft and as will be apparent from Fig. 1, when the nut is screwed home the tapered sleeve is forced axially relative to both the shaft and the gear, the latter being held against axial displacement relative to the shaft by the abutment provided by the shoulder 22. This movement of the sleeve provides a wedging action which it will be evident is capable of producing radial pressure between the shaft and the gear of very high magnitude and it has been found from actual experience that, with parts made from steel or other commonly used metals, the frictional lock that can be obtained by this action is capable of producing a resistance to turning of the gear relative to the shaft greater than can be obtained by the use of keyways and a key in parts of like material. As will be evident from the drawing, the hub of the gear may be made of any desired length in order to secure sufficient area of frictional contact between the bore and the sleeve to insure a frictional lock between the parts that will be positive under the torque forces to be applied to the assembly.

By virtue of the non-circular cross-section of the engaging surfaces of the sleeve and the shaft, the sleeve is rotationally fixed relative to the shaft and absorbs all torque forces that may be transmitted to the sleeve by the nut or other means used to force the sleeve into locking position. This is particularly true after the parts have been semi-assembled to a state where all of the engaging surfaces are in contact with each other so that no play exists.

In assembling the parts, the preferred procedure is to first assemble the parts to the extent of moving the sleeve into the gear until the latter is moved into abutting contact with the abutment on the shaft and the several parts brought into sufficiently firm contact to eliminate all clearance or play between them, but not sufficiently firmly to lock the gear on the shaft. Thereafter, by means of a suitable jig or other means the gear can readily be turned to its desired indexed position relative to the threads or grooves on the rotor or relative to any other part with respect to which accurate indexing is desired. Thereafter, and with the gear in its indexed position, the sleeve can readily be forced inwardly to its locking position without danger of shifting the gear from its indexed position. This may be accomplished because of the fact that no torque force is transmitted to the gear by this final operation, the wedging action producing on the gear only radial force and straight axial force due to the axial component of force introduced by the tapered surfaces.

In securing parts together in very accurately indexed relation it is important that the forces be evenly applied so as not to distort the parts, since distortion within the elastic limits of metals may readily result in inaccuracies of indexing greater than the tolerances permitted in precision devices. With the apparatus just described such distortion is avoided since the parts which are assembled in pressure engagement are symmetrical; and while other specific forms of non-circular surface between the sleeve and the shaft may be employed within the scope of the present invention, the form of surface embodying a multiplicity of relatively narrow flats is preferable since it enables desirably symmetrical parts to be employed. In addition, the use of a multiplicity of relatively narrow flats enables the sleeve to be mounted on the shaft so that it cannot turn, with the minimum difference between the effective diameter of the shaft and a round shaft of the same maximum diameter. Thus the shaft is not weakened by the presence of a keyway or other configuration which would materially weaken the shaft, and consequently this form of the invention may readily be applied to very small shafts or shafts of any diameter which are highly stressed, without weakening them appreciably.

While it is theoretically possible to employ a sleeve that is not split, depending upon the compression within its elastic limit of the material of the solid sleeve when the parts are assembled to effect the desired locking action, such an arrangement results in the introduction of undesirable additional stresses and consequently the split form of sleeve is much more desirable from a practical standpoint. While the desired results can be obtained by the use of sleeve segments made by splitting a sleeve for its entire length, this also is much less desirable than a unit sleeve of the kind illustrated. It is to be understood that as hereinafter employed the term "split sleeve" is intended to embrace sleeves either partially split as here illustrated or split throughout their length so as to be made up of a number of separate sleeve segments.

It is desirable, as shown in Fig. 1, that the sleeve be proportioned so that when the parts are assembled a substantial space 42 is left between the face of the gear and the collar 30 on the sleeve for the reception of the jaws of the gear puller, by means of which the assembled sleeve can be withdrawn after the nut 40 has been backed off, when it is desired to disassemble the gear and shaft. Such disassembly is frequently necessary in many types of apparatus in order to render bearings and other parts inside of the gear accessible and it is to be noted that in the apparatus of this invention the parts may readily be disassembled without in any way impairing the facility with which they can be reassembled and the gear reindexed with as great accuracy as in the case of an original assembly.

For the indexing of timing gears in the device of the kind shown in Fig. 2 it is evident that the rotors can be timed as accurately as desired if only one of the rotors is provided with means for indexed mounting of its timing gear in accordance with the present invention, but the advantages of ease of assembly and disassembly and the gain in strength due to the elimination of keyways and the like usually make it more desirable to mount each of the timing gears by means embodying this invention and in Fig. 2 the device has accordingly been shown with both gears secured to the respective rotors by means employing this invention.

In many instances it is desirable to have timing gears and the like closely associated with bearings and in Fig. 4 there is shown a mounting in which the shaft 16a is shouldered to provide a part 16b for the mounting of a ball bearing 44 the inner race 46 of which provides the abutment for the gear hub 38. Thus in this instance the sleeve 24 acts not only as a locking member for the timing gear 34 but also as a retaining member, acting through the gear, for holding the bearing against axial displacement relative to the shaft.

In order to illustrate other applications of the principles of the invention, there is shown in Figs. 5 and 6 an arrangement essentially the same as that previously described except that in the present instance the body held in indexed position on the shaft is a cam 48.

In the previously described embodiments, the body held in indexed position is provided with a tapered bore cooperating with the tapered outer surface of the sleeve. In some instances, for manufacturing or other reasons, it may be desirable that such body have a cylindrical rather than a tapered bore and by way of illustration of this there is shown a different form of the invention in Figs. 7 and 8. In this example there is shown by way of illustration a rotor 10a having a cylindrical bore 50 secured in indexed position on a shaft part 52 which may, for example, be the spindle of a machine tool on which the rotor is mounted for the purpose of shaping the grooves and lands in its surface. In this embodiment the flats 18, threads 20 and abutment 22 on the shaft are as previously described, as is also the sleeve 24. In this case, however, there is interposed between the sleeve 24 and the body 10a a second sleeve 54, this latter sleeve having a tapered bore 56 having the same taper as that of the outer surface 28 of the inner sleeve and a straight cylindrical outer surface 58 for engagement with the bore 50 of the body 10a. Sleeve 54 is split longitudinally and in order to secure the advantage of a one-piece sleeve is preferably split in the manner shown in Fig. 8 by means of slits 60 and 62, the former extending from one end of the sleeve to a place adjacent to the opposite end while the latter extend from said opposite end to a place adjacent the end to which the slits 60 extend. This arrangement of the slits permits of a substantially symmetrical and undistorted compression of the sleeve, which acts as a radial force transmitting member between the inner sleeve and the indexed body. It will be observed that in this embodiment only pure radial force is exerted on the indexed piece since axial thrust resulting from the contact of the tapered surfaces is transmitted to the abutment by the outer sleeve.

Obviously the dual sleeve arrangement is equally applicable to arrangements of the kind shown in Figs. 1 through 6, where the indexed piece is a gear or the like, if it is desired to provide such piece with a cylindrical rather than a tapered bore.

From the foregoing it will be apparent that the principles of the invention maybe embodied in a wide variety of specific forms of apparatus applied to a very wide variety of uses and the invention is accordingly to be understood as embracing all forms of apparatus falling within the scope of the appended claims.

What is claimed:

1. In combination, a shaft having portions of different diameter separated by a shoulder, the portion of smaller diameter having a non-circular surface, a sleeve on said portion of smaller diameter having an inner non-circular surface corresponding to the first-mentioned surface whereby said sleeve is fixed against rotation relative to said shaft, the outer surface of said sleeve being conical with the smaller end adjacent to but spaced from said shoulder, a timing gear having a conical bore around said sleeve and being angularly adjustable on said sleeve to any indexed position relative to said shaft, said gear abutting against said shoulder so as to be located axially with respect to said shaft, and means for moving said sleeve axially on said shaft towards said shoulder for wedging the sleeve between the shaft and the gear to frictionally lock the latter in said indexed position.

2. Apparatus as set forth in claim 1 in which the portion of larger diameter of said shaft constitutes a bearing engaging portion.

3. In combination, a shaft having portions of different diameter separated by a shoulder, the portion of smaller diameter having a non-circular surface, a sleeve on said portion of smaller diameter having an inner non-circular surface corresponding to the first-mentioned surface whereby said sleeve is fixed against rotation relative to said shaft, an anti-friction bearing on said shaft having an inner race abutting against said shoulder, the outer surface of said sleeve being conical with the smaller end adjacent to but spaced from said race, a timing gear having a conical bore around said sleeve and being angularly adjustable on said sleeve to any indexed position relative to said shaft, said gear abutting against said race so as to be located axially with respect to said shaft, and means for moving said sleeve axially on said shaft towards said shoulder for wedging the sleeve between the shaft and the gear to frictionally lock the latter in indexed position and for forcing it against said race to clamp the race between the gear and the shoulder.

4. In combination, a shaft, said shaft including a portion of non-circular cross section, a sleeve on said shaft portion having a conical outer surface and a bore of non-circular cross section complementary to said shaft portion for fixing the sleeve against rotation relative to the shaft while permitting relative axial movement of the sleeve on the shaft, a timing gear having a conical bore encircling said sleeve, means providing an abutment for limiting movement of said gear axially in one direction relative to said shaft, and means engaging said shaft and said sleeve for forcing said sleeve in said one direction relative to both said shaft and said gear to frictionally lock the gear against rotational movement relative to the shaft due to the wedging action of the sleeve.

References Cited in the file of this patent

UNITED STATES PATENTS

| | | |
|---|---|---|
| 602,181 | Howard | Apr. 12, 1898 |
| 611,556 | Blanton | Sept. 27, 1898 |
| 648,352 | Blanton | Apr. 24, 1900 |
| 971,660 | Brewster | Oct. 4, 1910 |
| 982,403 | Whitton | Jan. 24, 1911 |
| 1,395,913 | Ford | Nov. 1, 1921 |

FOREIGN PATENTS

| | | |
|---|---|---|
| 343,344 | Great Britain | Feb. 19, 1931 |
| 509,460 | Germany | Oct. 9, 1930 |